July 21, 1970  J. F. ROBERTSON  3,521,157
AUTOMOTIVE VEHICLE IGNITION MONITORING SYSTEM
Filed May 16, 1968
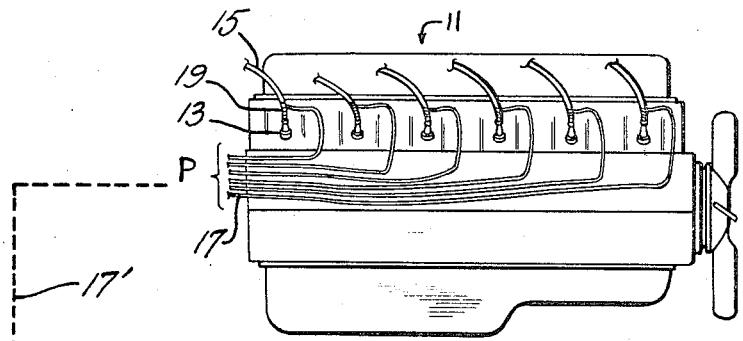
FIG. 1
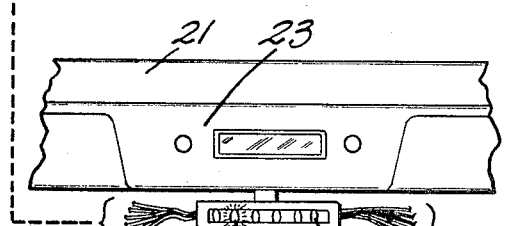
FIG. 2
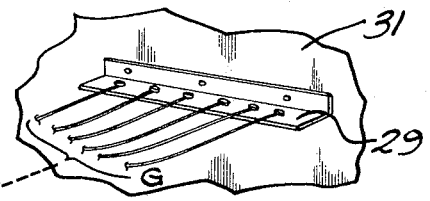
FIG. 6
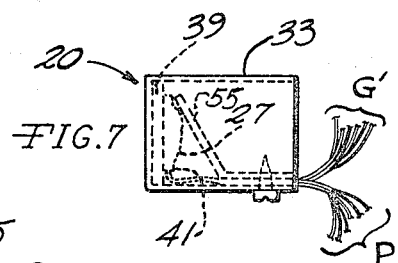
FIG. 7
FIG. 4
FIG. 5
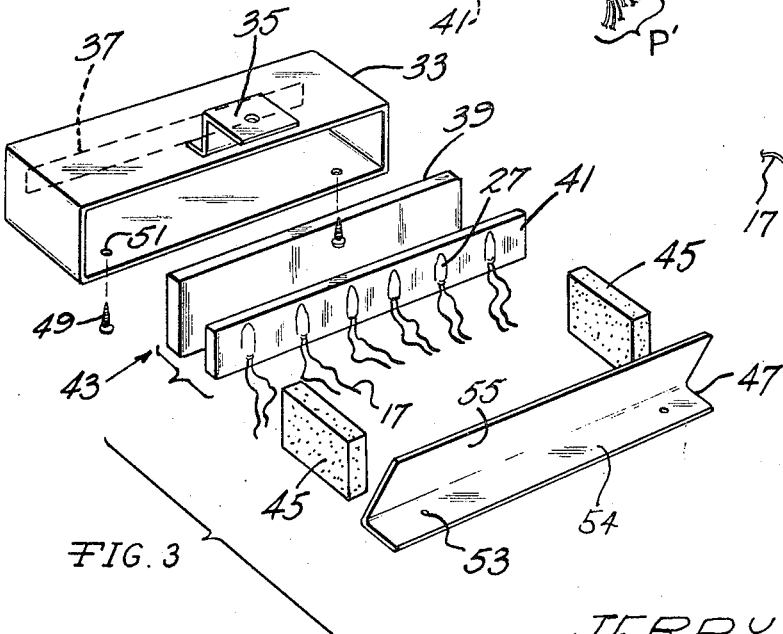
FIG. 3
INVENTOR
JERRY F. ROBERTSON
BY
Miller, Thomas, Pappas & McLeod
ATTORNEYS United States Patent Office 3,521,157
Patented July 21, 1970

1

3,521,157
AUTOMOTIVE VEHICLE IGNITION
MONITORING SYSTEM
Jerry F. Robertson, 5497 Brown Road,
Davison, Mich. 48423
Filed May 16, 1968, Ser. No. 729,573
Int. Cl. G01r 13/42
U.S. Cl. 324—18                          2 Claims

ABSTRACT OF THE DISCLOSURE

A display device is disclosed for mounting to an automobile dashboard. A housing contains a plurality of neon tubes, or the like, displayed through a portal in the housing for viewing by vehicle driver and passengers. The neon tubes are connected individually to the vehicle spark plugs, by inductive or other indirect external coupling means. The neon tubes are imbedded in a plastic layer for permanent, anti-vibrating, relative positioning. The tubes flash in correspondence to spark plug firing and are normally arranged to fire consecutively in order from left to right. The result is an optically perceptible sequence of light flashes, with a particularly engaging visual effect. The unit also serves as an analytical device, with the character of the neon flash corresponding to the efficiency of the firing of the associated spark plugs. A non-flashing light indicates a completely non-firing plug. Weak or unsteady flashes indicate a mis-firing spark plug. Cable wrapping conductor strips, and alternative cylindrical braided shielding cables are revealed as means for the indirect coupling of the neon tubes to the spark plug wires. The tubes are grounded to the vehicle.

BACKGROUND OF THE INVENTION

Spark plug monitoring devices are well known: Those disclosed by the patented art are known to be complicated and to require extensive electronic apparatus in association with neon bulbs for visual indication of electrical discharges. An example of such a device is the disclosure of U.S. Letters Patent 2,969,500, which teaches a spark plug and an ignition indicator system therefor. This apparatus requires the use of special spark plugs, which comprise part of the invention, in order to provide a spark plug monitoring system.

SUMMARY OF THE INVENTION

My invention is directed to a simplified ignition indicating system, which operates without being combined with other extraneous electronic apparatus, and can be quickly connected to a standard vehicular engine. The electric connections are simple in the extreme and operate upon standard spark plugs as existing in the automobile for which my unit may be acquired as an accessory item. No modification need be made in the ignition system of the vehicle or any other of its components. Rather my apparatus is designed for sale to the automobile accessory trade and is specifically designed to be easily and quickly connected to any automobile dashboard and simply arranged for spark plug energization without even requiring the making of direct wire connections.

The unit of my invention provides a continuous monitoring service so that faulty spark plugs may be discovered immediately and replaced. This advantage allows a great savings in fuel, whereas normally a faulty spark plug might not be detected until it is actually failing to fire after many uneconomical miles have been driven. Moreover the check-out is performed free of charge, and eliminates the cost and inconvenience of obtaining the services of a professional auto mechanic.

2

My invention is also designed for creation of a pleasant visual effect inside the vehicle, especially at night; the neon tubes are specially imbedded in a plastic mounting which diffuses the light emanating from the bulbs and softens the effect of individually energized neon lamps. Thus, in addition to the engine monitoring or analyzing effect of my invention, it also provides a pleasant wave form of visual pulses across the display unit, to provide a very popular novelty unit with proven consumer appeal.

Accordingly it is an object of the present invention to provide a greatly simplified spark plug monitoring device for use in automotive vehicles.

Another object of the present invention is to provide an extremely simple to install spark plug monitoring device as an accessory for automotive vehicles which, in addition to serving as an analyzer of engine performance, serves also as a novelty device for delivering an extremely pleasant visual impression for car passengers and driver.

Another object of the present invention is to introduce an electronically simple engine ignition analyzer for quick and simple attachment to an automobile, which can be visually monitored from within the vehicle passenger compartment, and which checks engine ignition continuously in order to detect plugs misbehaving under specific engine load conditions.

Another object of the invention is to provide a self-testing apparatus for engine ignitions, without the need for inconvenient and expensive consultations of professional engine mechanics.

Another object of the present invention is to provide a spark plug monitoring apparatus of extreme electronic simplicity, which also yields novel light effects.

Other objects of this invention will be apparent from the herewith associated specification, drawings and claims.

In the drawings:

FIG. 1 is a side elevation view of a six cylinder automobile engine, and shows the spark plug wires therefor with the inductive coupling means of the present invention in wrap around relation to the spark plug wires.

FIG. 2 is a front elevation view of a portion of an automobile instrument panel showing an automobile radio mounted on the instrument panel, and showing also the display unit of the present invention connected below the instrument panel and underneath the radio thereof.

FIG. 3 shows an exploded perspective view of the components of the ignition display unit of the present invention, and the manner of assembly thereof.

FIG. 4 is a detailed view of one of the spark plugs as seen in FIG. 1, and shows the manner of connection of the neon tubes to the spark plug lead wires by the wrap around couplings of the present invention.

FIG. 5 shows an alternative means for making the indirect electrical connection shown in FIG. 4.

FIG. 6 shows the grounding plate mounted to the firewall on the automotive vehicle, to which is connected each of the ground wires from the neon tubes separately, in the manner of the present invention.

FIG. 7 shows a side elevation view of one embodiment of the display unit of the present invention.

DESCRIPTION OF PREFERRED EMBODIMENT

Referring to the drawings, FIG. 1 shows an automobile engine 11 with spark plugs 13 and spark plug wires 15. Tapping wires 17 are shown inductively connected by wrap strips 19 to the spark plug wires 15.

The tap wires 17 converge near the engine at P into a commonly wrapped single conduit, which leads to separation point P' proximate to the display unit 20. The path of the collected cables is indicated schematically by the broken line at 17'. On the dashboard 21 of the automobile (not shown) is accessibly located an automobile radio mounting area 23 upon which a radio may or may not be provided. In the present era of automotive development most cars are provided with such a radio, some of which are rather sophisticated electronically; that is, they comprise Hi-Fi and/or AM-FM components. For these reasons it is the intended utilization of the present apparatus to be mounted to the underside of the dashboard as shown in FIG. 2. This arrangement leaves the display unit 20, and its associated wiring, substantially removed from the path of incoming electromagnetic waves carrying the signal for radio reception. Thus, without need for shielding, the present invention will operate without offering interference to automobile radio reception.

The strip wrap 19 of FIG. 1 may be appreciated in more detail by reference to FIG. 4 where the covered spark plug wire 15 is seen inductively wrapped by tap wrap 19, spirally coiled rather tightly around the spark plug wire 15. The strip wrap 19 is of an easily bent, permanently deforming material which is electrically conductive. Copper, aluminum or similar conducting metals may be utilized for this purpose. The tight wrap gives a positive engagement with the spark plug lead wire 15, and the coiled effect gives an inductive structure in which current pulsing through the spark plug wires sets up an electromagnetically induced corresponding current in the strip 19 (by well known principles of electromagnetic induction). Although induction is presumed as the most appropriate theoretical explanation of this common phenomenon, it may be that electrostatic or capacitance principles could also be incorporated into a theoretical exposition of the technical principles involved. Whatever the underlying explanation, an electric current pulse is induced into the strip 19 and carried away by the connecting tap wire 17 to one of the neon bulbs 27, causing it to flash as seen in FIG. 2. Other bulbs 27 are provided and will in their turn flash when energized by currents induced from the tap connections to the associated spark plugs.

The neon bulb circuits are completed through the lead out wires 28 which are collected at G' into the common conduit, depicted schematically at the numeral 28', to separate again at G where each of the wires 28 is separately grounded to ground plate 29. The plate in turn is securely and electrically fastened to the firewall 31 of the vehicle (not shown). The grounding of one of the lead wires from each of the neon bulbs 27 effectuates a completed circuit for bulb flashing upon energization through the inductive coupling at 19.

It should be appreciated that for purposes of illustration a six cylinder engine has been selected. Consequently the corresponding number of ground wires at G and tap wires at P are shown as six in number. Of course the flash bulbs 27 in the display unit 20 also number six. However the same principles may be applied to extend the unit for use with vehicles having any number of cylinders, for example two, four, eight, or more.

From an electronic point of view it should be pointed out that the bulb circuits are each grounded separately, as seen in FIG. 6, rather than through a common ground. Separate grounding has been experimentally determined to lead to individual flashing of the bulbs in correct one-to-one correspondence with the discharge of the appropriate spark plug. Common grounding, on the other hand, has been shown to develop haphazard flashing of the display bulbs, out of correct relation with the associated spark plug firings. A theoretical explanation offered for this observation is the effect of capacitance, eddy currents, or the like in the decreased lengths of grounding wires. In any event, the currents generated by the spark plugs appear to cross over, in a common ground system, to energize display bulbs other than the one connected to the firing plug. Consequently, the present invention incorporates separate grounding, as already described.

An alternative means of inductive coupling is displayed in FIG. 5 where the wrap around strip 19 is replaced by a cable shielding type of braided cylindrical conductor 19'. Such a braided conductive device slips easily over the spark wire 15, and flexes to conform to the sinuous path of the spark wire 15. The conductor 19' completely ensheathes the spark wire 15 and cannot become dislodged therefrom. The wrap strip 19 is preferred however, as a less expensive expedient that can be connected without the necessity of disconnecting the spark wire 15.

The mechanical assembly of the display unit 20 will now be described in detail. FIG. 3 shows, in exploded form, a preferred method of display unit construction. A durable housing 33 is attached to the underside of a dash panel by the bracket 35. The housing 33 is provided with a frontal viewing portal or port 37, and is preferably fabricated of a heavy gauge chrome plated steel for durability and tasteful integration with the positively styled dash panel of the kind normally found in modern automobiles, particularly those of United States manufacture. Inserted into the housing 33 is a transparent viewing window 39 which is cemented or otherwise secured against the inside of the frontal face of the housing, as appreciated by the view of FIG. 7. Thus, the window 39 covers the portal 37 against entry of foreign objects, but leaves the portal open for viewing of the discharge bulbs 27. The bulbs 27 may be mounted in a variety of ways, individually or otherwise, immediately behind the window 39, and for best viewing are vertically oriented in a substantially equidistant spacing. The metallic nature of the housing 33 provides a shielding effect to contain the electromagnetic fields which are generated by the flashing neon bulbs. The shielding effect may be of some necessity where the unit is to be mounted other than below the radio in the automobile, so as to minimize interference. However the bracket 35 does permit mounting of the unit to the top of the dashboard if such is desired due to lack of space or inconvenient positioning below particular dashboards.

Behind the plastic window is mounted the tube bank 41 which, in my preferred construction, is composed of the complete row of tubes 27 imbedded in a longitudinal strip of transparent material such as one of the now popular polymer resin plastics. Other substances including the polyacrylates or polymethacrylates (such as Plexiglas) are also convenient media. Theoretically even glass could be utilized, although the preparation and imbedment of the tubes would represent a more costly and complicated process than the above cited examples. The composition will normally comprise a fluid substance into which the bulbs 27 are set with the composition subsequently rigidified by the addition of a hardening chemical. Polyester resin compounds are a specific example of such a useful integrating material. The tubes should be set so as not to protrude from the front of the bank 41, so that the bank may be cemented in a flat planar contact to the window 39 as seen in the side view of FIG. 7. Preferably the light bank 41 is cemented to the window 39 prior to dropping the entire integrated-bulb light unit 43, into the housing 33. No such restriction is placed on the rear surface of the bank 41, and therefore the bulbs need not be completely immersed when being set in the plastic material. I.e., the bulbs may bulge slightly from the rear side of the strip 41 as seen in the view of FIG. 7. Each pair of wire leads 17 must extend from the bulbs to the exterior of the strip bank 41 for a sufficiently long projection to be connected to the individual wire elements 17 and 28 of the conduits 17' and 28' respectively, outside the housing. Behind the light unit 43 are preferably positioned a pair of styrofoam cushioning pads 45 which are disposed at either end of the light unit 43, between it and the pressure plate 47, to complete the assembly of the display unit. The plate 47 connects to the housing via metal screws 49 located through housing holes 51 for connection to the plate holes 53 on the horizontal attachment portion 54 of the angled plate 47. The styrofoam pads 45 are squeezed between the upward extension portion 55 of the angled press plate to hold the light unit 43 in snug, anti-rattling contact against the interior front face of the housing 33. It should be noticed that the pressure portion 55 of the plate 47, is angled somewhat rearwardly away from a precise 90 degree angle with the connector portion 54. This eliminates the necessity of having the pressure portion 55 precisely spaced back from the front face of the housing 33, since the slant develops an effectual spacing which varies over a range. Therefore, the range of spacing of the plate 55 will assure that some portion, at least, of the pads 45 will be snugly compressed in place. The pressure or slant back portion 55 of the assembly plate 47 also facilitates the manual assembly of the entire unit.

An alternative embodiment is shown in the side view of FIG. 7 in which no styrofoam pads are utilized. Instead assembly pressure is developed solely by the pressure portion 55 of the assembly plate 47, in a slant forward (instead of slant back) position against the light unit 43, as seen in the broken line of the figure. In order to develop the appropriate degree of resilient pressure and yet be manually bent into the slant forward contact with the unit 43, it is preferable that the slant portion 55 of assembly plate 47 be made of a somewhat thinner gauge steel than that used in the embodiment of FIG. 3.

In both the embodiments of FIG. 3 and FIG. 7, the assembly plate serves also to clamp the discharge bulb leads 17 and 28 against the lower face of the housing 33. Thus, if the leads are connected to the trunk conduits 17' and 28', interiorly of the housing, the danger of disconnect from external pulling is eliminated. Thus the assembly plate 47 serves a dual purpose of mechanically locking the entire unit into secure assembly, and providing a wire clamp or harness for the electrical connections to the display unit.

In operation the lights may be connected to the spark plugs of the vehicle in any order. However for the most uniform flashing effect, it is desirable to connect the bulbs from one side of the light unit 43 consecutively to the other side to the spark plugs in the same order in which they fire. The flashing sequence will then proceed from left to right (or vice versa) in consecutive order. The flashing thus proceeds across the face of the display unit in a pulse or wave-form effect, much in the fashion that lights flash to give a travelling wave-form on theatre marquees, or other such advertising signs.

The steady pulsing across the face of the light bank indicates a regular and steady firing of the spark plugs. Failure of any plug to light, or intermittent lighting, or dim lighting, will give evidence of a less than ideal functioning of the corresponding spark plug. The specific character of the flash (or failure to flash) of a specific bulb can often be recognized as symptomatic of a particular spark plug condition. The artistry involved in such an analysis is developed by experience, and has been explained in more detail in works included in the present state of the art.

The present invention is directed not only to the analyzing aspects of the spark plug apparatus, but to the concomitant feature of a very engaging light effect which is achieved by the display unit. The flashing of the bulbs has proven, upon examination by numerous viewers, to produce an eye pleasing and extremely interesting effect. The soft glow of the bulbs flashing in a predetermined sequence, and accelerating with acceleration of engine speed, yields a most intriguing, and even relaxing, visual sensation. The present apparatus has been specifically developed to enhance this effect, by the inclusion of the Plexiglass strip 41 which serves to diffuse the light flashes into a more continuous wave motion across the light bank, as opposed to separate pin prick flashes in devices of the prior art. Moreover various other special effects may be derived from the light unit by the addition of coloring matter to the Plexiglas strip 41. It is even contemplated to include various colored segments in the strip 41, to yield a selected color pattern of flashes.

The soothing, eye pleasing effect of the apparatus is further augmented by the deliberate inclusion of a dark background behind the tube bank 43. This is best effected by painting black or otherwise darkening the front surface of the slant portion 55 of assembly plate 47. This darkened surface has led to the result that the flashing of the display unit lights is clearly visible even in daylight, which is not the case with hitherto known units engineered primarily for the purpose of ignition testing. The present unit, in addition to being clearly discernible in daylight, delivers a most dramatic effect at night, to a degree described by some as semi-hypnotic when gazed at steadily. The driver, of course, is watching the road and therefore is precluded from any such type of viewing that might be hazardous. However passengers find the unit a most interesting diversion, especially useful in whiling away the time on an otherwise uninteresting journey. More youthful users are captivated by the modern aspect of the flashing lights, which is in keeping with the current trends to glamorize computing machinery and other such technical equipment.

An alternative visual effect may be obtained by having the light bank 41 separated, in part, from the window 39. This can be accomplished by reversing the prefered bank 41 position, so that the bulb bulges are pressed against the window 39. Thus, in effect, the bulbs 27 would be projecting from the front, rather than rear, of the bank 41.

The analytical use of the equipment may be outlined as follows:

| Symptom | Diagnosis |
| --- | --- |
| (1) Regular steady glow | Good system—cylinder is firing. |
| (2) Weak light, or no light, or irregular flash. | Plug not firing. Check for carbon build-up, cylinder pumping oil, loose plug, points, or spark gap adjustment. |
| (3) Light goes out on hard acceleration. | Check for moisture at plug, faulty spark plug wire, poor compression. |
| (4) No light when cranking engine. | |
| (5) Light flash, but car won't start. | Check condenser, points, coil, loose connections. |
| (6) Lights dimmer or slower than usual and engine won't start. | Ignition O.K.—check fuel system. Check coil for spark, and loose connections. |
| (7) Same light ceases flashing at a certain speed. | Check plug. |

Do not atempt to use the display for engine analysis while decelerating.

It should be appreciated that the unit of my invention can be utilized for engines other than those on cars. For example power lawn mower motors, marine engines, and the like, can be monitored by my device; it will also serve as a visual display unit, particularly as on pleasure boats, and other recreational vehicles.

I claim:

1. An automotive vehicle ignition monitoring system for an automotive vehicle having a plurality of spark plugs associated in a one-to-one correspondence with the combustion cylinders of the vehicle engine and including an electrically insulated ignition wire connected to each of said spark plugs for delivery of normally equal electrical pulses to said plugs at regularly timed intervals and in a predetermined firing order, said monitoring system including, in combination, a plurality of gas discharge tubes, each of said tubes having first and second wire leads defining an electrical path to and from the tube, means mounting said tubes to define an orderly array, means including a plurality of electrically conducting metallic members individually electrically connected to one of said first leads of one of said discharge tubes and adapted to encompass the periphery of an extended length of one of said insulated ignition wires, said metallic members being adapted to induce an electrical pulse in said first leads in a predetermined sequence, means independently electrically grounding each of said second wire leads on said tubes whereby electrical pulses in said ignition wires generate a corresponding predetermined sequence of visual pulses in said array of discharge tubes, the brightness of each said visual pulse being a function of the magnitude of the corresponding spark plug electrical pulse, a housing adapted to be mounted inside an automotive vehicle and having a wall defining a viewing port adapted to face toward the vehicle interior, each of said gas discharge tubes being embedded in a rigid layer of light transmitting material one side of which is substantially smooth, and means fixing said layer of light transmitting material in said housing whereby all of said tubes are visible through said port, said means for fixing said light transmitting material in said housing including an assembly plate dihedrally formed to define an attachment portion, means fixing said attachment portion to said housing whereby said first and second wire leads are clamped between said attachment portion and said housing, said assembly plate also including a slanted pressure portion having one surface thereof darkened and providing a contrasting background surface for said discharge tubes, said slanted portion resiliently holding said layer of light transmitting material adjacent said viewing port of said housing.

2. The combination as set forth in claim 1, including a plurality of resilient cushioning shim pads adapted to be compressed between said slanted pressure portion and said rigid layer of light transmitting material, said resilient pads being disposed out of the light path between said discharge tubes and said darkened pressure plate surface.

References Cited
UNITED STATES PATENTS

| | | | |
|---|---|---|---|
| 2,005,992 | 6/1935 | Heaton | 324—18 |
| 3,064,186 | 11/1962 | Vincent | 324—133 |

RUDOLPH V. ROLINEC, Primary Examiner

M. J. LYNCH, Assistant Examiner